(12) United States Patent
Conmy et al.

(10) Patent No.: US 7,082,402 B2
(45) Date of Patent: *Jul. 25, 2006

(54) ELECTRONIC CALENDAR WITH GROUP SCHEDULING AND STORAGE OF USER AND RESOURCE PROFILES

(75) Inventors: Douglas Walter Conmy, Nashua, NH (US); Steven Robert Beckhardt, Nashua, NH (US); John Banks-Binici, Westborough, MA (US); Robert Slapikoff, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/100,133

(22) Filed: Jun. 19, 1998

(65) Prior Publication Data

US 2001/0014866 A1    Aug. 16, 2001

Related U.S. Application Data

(60) Provisional application No. 60/050,155, filed on Jun. 19, 1997.

(51) Int. Cl.
*G06Q 99/00* (2006.01)
(52) U.S. Cl. .......................................... 705/8
(58) Field of Classification Search ................ 705/7–9; 345/963
See application file for complete search history.

(56) References Cited

U.S. PATENT DOCUMENTS

| | | | | |
|---|---|---|---|---|
| 4,807,155 A | * | 2/1989 | Cree et al. | 364/518 |
| 4,817,018 A | * | 3/1989 | Cree et al. | 364/518 |
| 4,866,611 A | * | 9/1989 | Cree et al. | 364/300 |
| 4,977,520 A | * | 12/1990 | McGaughey et al. | 345/753 |
| 5,050,077 A | | 9/1991 | Vincent | 705/8 |
| 5,124,912 A | * | 6/1992 | Hotaling et al. | 364/401 |

(Continued)

FOREIGN PATENT DOCUMENTS

EP     574138 A1 * 12/1993

OTHER PUBLICATIONS

Amy Doan, "Meeting Maker 4.0 Increases Scalability", Infoworld, Jan. 6, 1997, p. 37.*

(Continued)

*Primary Examiner*—Susanna M. Diaz
(74) *Attorney, Agent, or Firm*—Pillsbury Winthrop Shaw Pittman LLP

(57) ABSTRACT

A system for scheduling time intervals for a plurality of users comprises a database associated with one or more server means for storing a profile for each potential invitee of the system. Each invitee profile comprises user profiles that have information regarding available and unavailable times for that user and the electronic mail address for the user and resource profiles having information about the available times for a particular resource such as a room or equipment. A request generator connected over a network to the one or more server generates a request for allocation of a time interval for one or more of the plurality of invitees. The system then provides a busy time determination device that gathers the profiles for the plurality of invitees that were requested by the request generating means and that are available in the databases and determines whether those invitees are available during the time interval requested by the request generating means. For all available invitees, the electronic mail address in the profile is used to send each available requested invitee an invitation to attend at the requested time interval.

37 Claims, 9 Drawing Sheets

U.S. PATENT DOCUMENTS

| | | | | |
|---|---|---|---|---|
| 5,289,531 | A | * | 2/1994 | Levine .................... 379/93.23 |
| 5,303,145 | A | * | 4/1994 | Griffin et al. ............... 364/401 |
| 5,369,570 | A | * | 11/1994 | Parad ......................... 364/401 |
| 5,467,268 | A | | 11/1995 | Sisley et al. ................ 364/401 |
| 5,519,606 | A | | 5/1996 | Frid-Nielsen et al. ....... 364/406 |
| 5,634,016 | A | * | 5/1997 | Steadham, Jr. et al. ..... 395/329 |
| 5,659,731 | A | | 8/1997 | Gustafson ................... 395/604 |
| 5,692,125 | A | | 11/1997 | Schloss et al. .............. 395/209 |
| 5,724,521 | A | | 3/1998 | Dedrick ....................... 395/226 |
| 5,774,867 | A | | 6/1998 | Fitzpatrick et al. ............ 705/8 |
| 5,790,974 | A | * | 8/1998 | Tognazzini ................. 701/204 |
| 5,845,257 | A | | 12/1998 | Fu et al. ........................ 705/8 |
| 5,867,822 | A | | 2/1999 | Sankar .......................... 705/8 |
| 5,890,134 | A | | 3/1999 | Fox ............................... 705/9 |
| 5,893,073 | A | | 4/1999 | Kasso et al. ................... 705/8 |
| 5,903,845 | A | * | 5/1999 | Buhrmann et al. ......... 455/461 |
| 5,907,829 | A | | 5/1999 | Kida ............................. 705/9 |
| 5,943,652 | A | | 8/1999 | Sisley et al. ................... 705/9 |
| 5,963,913 | A | | 10/1999 | Henneuse et al. ............. 705/9 |
| 5,974,392 | A | | 10/1999 | Endo ............................. 705/8 |
| 6,016,478 | A | * | 1/2000 | Zhang et al. .................. 705/9 |
| 6,035,278 | A | | 3/2000 | Mansour ........................ 705/9 |
| 6,061,506 | A | * | 5/2000 | Wollaston et al. .......... 395/500 |
| 6,064,977 | A | * | 5/2000 | Haverstock et al. ........... 705/9 |
| 6,085,166 | A | * | 7/2000 | Beckhardt et al. ............. 705/9 |
| 6,101,480 | A | * | 8/2000 | Conmy et al. ................. 705/9 |

OTHER PUBLICATIONS

Stuart Mainitsky, "Marking Time", Network World, Jul. 24, 1995, p. 36.*

Marina Roesler et al. "Intelligent Agents: Software Servants for An Electronic Information World (and More!)", Online, Jul. 1994, p. 19-32.*

Anonymous, "IBM-Lotus: Calengaring is on the Agenda," Computer Reseller News, Dec. 9, 1996, n714, pp. 119-122.*

Willen, Claudia. The ABCs of Outlook 97. Sybex, Inc. Chapters 8-10. Mar. 17, 1997.*

Borland, Russell. Running Microsoft Outlook 97. Microsoft Press. Chapter 8. Jun. 25, 1997.*

Mitchell, Gabrielle. "The Future is Bright for Microsoft Outlook 97." PC World. vol. 14, No. 11, p. 80. Nov. 1, 1996.*

Maxwell, Kimberly. "Using Scheduler+ 95." At The Office. vol. 6, No. 11. Nov. 1995.*

"Automatic Calendar Update with User's Location Information." IBM Technical Disclosure Bulletin. vol. 37, No. 3, pp. 665-666. Mar. 1, 1994.*

Kvitka, Andre. "Outlook Presents a Great Picture." Infoworld, vol. 18, No. 35, p. 91, Aug. 26, 1996.*

Rizzo, John. "Meeting Maker XP: ON Technology Takes Its Group Scheduler Cross-Platform." MacUser, vol. 10, No. 4, p. 42(3), Apr. 1994.*

"Domino Beta Testing." The Press (2nd ed), p. 40, Jun. 11, 1996.*

"IBM/Lotus Announce Strategy for Integrated Calendaring and Scheduling Across and Beyond the Enterprise." Lotus Press Release, Retrieved through web archive on www.lotus.com, dated Jan. 22, 1996.*

"Work-Group Computing: Lotus Calendaring & Scheduling Strategy." EDGE: Work-Group Computing Report, vol. 4, No. 139, page N/A, Jan. 18, 1993.*

Green, Terence. "Groupware with Tighter Web Links." PC User, No. 296, p. 37(3), Nov. 27, 1996.*

Welch, Nathalie. "Lotus Ships Mac Version of Organizer: Schedules Synced Through cc:Mail." MacWeek, vol. 8, No. 11, p. 12, Mar. 14, 1994.*

"Campbell Services: OnTime Real Time Group Scheduler Previews at NetWorld, Wins Early Industry Praise." Business Editors and Computer Writers, Oct. 4, 1993.*

Rash, Wayne. "7 Swift Group Schedulers." Windows Sources, vol. 1, No. 8, p. 248(13), Sep. 1993.*

Marshall, Patrick. "Organize Meetings With the Greatest of Ease." InfoWorld, vol. 15, No. 34, p. 63, Aug. 23, 1993.*

Loudermilk, Stephen. "Beyond Links Mail, Schedule Packages." PC Week, vol. 10, No. 2, p. 57, Jan. 18, 1993.*

"Beyond Provides Group Scheduling Capability for BeyondMail." PR Newswire, p. 0104NE007, Jan. 4, 1993.*

Wilson, Jayne. "BeyondMail Links Up With Two Scheduling Products—Meshes With OnTime, CaLANder." InfoWorld, vol. 15, No. 3, p. 35, Jan. 18, 1993.*

Nunno, Mildred. "New! Improved!" PC Sources, vol. 4, No. 4, p. 67, Apr. 1993.*

Gaskin, James E. "WP Office: Powerful, But Plain: WordPerfect's Office 3.1 For Unix Works Like Its DOS Counterpart." Open Systems Today, No. 97, p. 45, May 11, 1992.*

Groves, Martha. "COLUMN ONE Memo Pads Give Way to Modems; Technology is Changing the Way Secretaries Do Business." The Los Angeles Times, p. 1, Feb. 4, 1994.*

Laric, Shai. "Computer Currency." The Journal of Services Marketing, vol. 8, No. 3, p. 77(3), 1994.*

Marshall, Patrick. "Making the Most of Messaging." InfoWorld, vol. 15, No. 42, p. 76, Oct. 18, 1993.*

Hettler, Mark. "Groupware Platforms for NT." Computing Canada, vol. 22, No. 22, p. 22(2), Oct. 24, 1996.*

Marshall, Thomas & Tom Young. "Contact Management Software: It's Not What You Know." InfoWorld, vol. 16, No. 52, 1, p. 62(12), Dec. 26, 1994.*

"On Technology Unveils Web Scheduling Technology." Newsbytes News Network, page N/A, Sep. 30, 1996.*

Snyder, Joel. "The Dating Game." Network World, vol. 13, No. 11, pp. S21-S23, Mar. 11, 1996.*

"ON Technology Adds Internet Scheduling Concept Center to Web." PR Newswire, p. 918NEW002, Sep. 18, 1996.*

"ON Technology Joins Internet Scheduling Standards Group, Offers Paper for Simple Scheduling Transport Protocol." PR Newswire, p. 0724NEW013, Jul. 24, 1996.*

"Newsbytes Daily Summary." Newsbytes, page N/A, Sep. 30, 1996.*

Miley, Michael. "Integrating E-Mail Across Enterprise LANs." InfoWorld, vol. 14, No. 19, pp. S47-S50, May 11, 1992.*

"No Matter What You Call It, Novell's GroupWise is a Solid Workgroup Computing Solution." CommunicationsWeek, No. 535, p. 14, Dec. 12, 1994.*

Dellecave Jr., Tom. "It's About Time; Group Scheduling Adds a Vital Dimension to Workgroup and Enterprise Collaboration." InformationWeek, No. 525, p. 52(7), May 1, 1995.*

Marshall, Patrick. "Meeting Maker XP Beefs Up Back End." InfoWorld, vol. 17, No. 35, pp. 95-96, Aug. 28, 1995.*

Schindler, Esther. "Meeting Maker XP for OS/2: the Cross-Platform Scheduler." PC Magazine, vol. 15, No. 5, p. 51, Mar. 12, 1996.*

Negrino, Tom. "Reviews: Meeting Maker XP 3.1." MacWorld, vol. 13, No. 1, p. 69, Jan. 1996.*

Magidson, Steven R. "When Can We Get Together?" LAN Technology, vol. 8, No. 6, p. 73(6), Jun. 1992.*

"Generalized Request/Reply Mechanism for Use in Asynchronous Distributed Environments." IBM Technical Disclosure Bulletins, vol. 29, No. 8, pp. 3345-3357, Jan. 1987.*

"Electronic Climatical Scheduler Mechanism." IBM Technical Disclosure Bulletin, vol. 37, No. 4A, pp. 121-122, Apr. 1, 1994.*

"Electronic Climactic Scheduler Mechanism." IBM Technical Disclosure Bulletin, vol. 37, No. 1, pp. 129-130, Jan. 1, 1994.*

"Business Conferencing." IBM Technical Disclosure Bulletin, vol. 39, No. 1, pp. 315-316, Jan. 1, 1996.*

Introducing Calendar for Windows (and DOS) (Apr. 1992).

Smith et al., "Scheduling Across the Enterprise," Byte, No. 19, vol. 6 (Jun. 1994) p. 216.

Nance, Barry, "Web Middleware Glue Binds Web Apps," Network Computing, No. 809 (May 15, 1997), p. 107.

* cited by examiner

ELECTRONIC CALENDAR WITH GROUP SCHEDULING AND STORAGE OF USER AND RESOURCE PROFILES

RELATED APPLICATIONS

This application claims priority from U.S. Provision Application No. 60/050,155 filed Jun. 19, 1997 entitled "Electronic Calendar With Group Scheduling." This application is related to co-pending applications entitled "Electronic Calendar With Group Scheduling," U.S. application Ser. No. 09/100,223 filed herewith, "Electronic Calendar With Group Scheduling and Automated Scheduling Techniques For Coordinating Conflicting Schedules," U.S. application Ser. No. 09/100,134 filed herewith, and "Electronic Calendar With Group Scheduling and Asynchronous Fan Out Method," U.S. application Ser. No. 09/100,132 filed herewith.

FIELD OF THE INVENTION

The invention relates generally to network-based electronic calendars, schedulers, and tasking systems for groups of users.

BACKGROUND OF THE INVENTION

With increased reliance on network-based work environments, software applications designed to enhance the efficiency and productivity of workers in that environment have evolved. One type of application that has emerged is referred to as an electronic calendar or personal information and time manager.

Lotus Organizer™ is one example of a popular electronic, personal information, and time manager for scheduling appointments, tracking to-dos, maintaining address lists, managing contacts, and more. Organizer's multi-access, multi-user database format allows multiple users to share the same file for group calendaring, contact, and task management. Organizer's daybook-style user interface makes it easy to use. Organizer has a group scheduling feature that enables a user to schedule a meeting and invite other users to attend. However, there are limitations to its capabilities. Other electronic calendars exist and also are subject to functional limitations.

SUMMARY OF INVENTION

One object of the invention is to overcome these and other drawbacks of existing systems.

It is another object of the invention to provide an electronic calendar with group scheduling that operates in a client/server environment and that provides an electronic calendar with group scheduling wherein people, rooms, and resources may each be treated as invitees for a meeting.

It is another object of the invention to provide an electronic calendar with group scheduling that operates in a client/server environment, where a name and address book is stored for users within a domain, and a profile document is stored for each user with user availability information contained in the profile.

It is another object of the invention to provide an electronic calendar with group scheduling that may automatically coordinate scheduling of invitees, where the invitees name/address (or equivalent information) resides on multiple servers.

It is another object of the invention to provide an electronic calendar with group scheduling that enables a profile document to be created for rooms, and thereby to facilitate the treatment of a room as an invitee.

Expanding upon past capabilities, the invention enables full group scheduling and mobile capabilities (e.g., via Lotus Domino 4.5), integration with the World Wide Web and intranets, as well as enhanced information management capabilities. The invention is an improved system and method for scheduling events involving multiple participants via electronic calendars in a networked environment. To accomplish these and other objects of the invention, according to one embodiment, an electronic calendar with group scheduling capability is used in a client/server environment.

One aspect of the invention is that people, rooms, and resources may all be treated as invitees. For example, when a meeting coordinator generates a request for a meeting via a client, the coordinator specifies the people, room(s) (or room requirements), and resources to be invited, and a proposed date and time. The request for a new meeting may be generated from a form that resides on a client. Via network connection or dial-up link, this information is passed to a server as a query to determine the availability of the invitees. A profile document is created for each invitee (room, person, and resource). If it is a Lotus Notes server, for example, the Names.NSF file is accessed. The profile document includes the invitee's normal work hours, the times previously scheduled for that invitee for other appointments (or time allocations), and other desired information. From this profile, a "Busy Time" file is generated. This file is a consolidation of all the unavailable times for each invitee. Preferably, the calendars are monitored and the "Busy Time" file is updated based on new, modified, and deleted entries.

According to another aspect of the invention, rooms (and resources if desired) are defined by completing a profile that is stored in a name and address book. Information such as the room capacity and its built-in resources may be defined. This provides the flexibility of reserving a room first for a given period of time, then determining who is available. Alternatively, one of the invitees may be a room so that all available rooms (meeting certain criteria) may be found during the DB (database) search. A calendar may be associated with each room.

According to an embodiment of the present invention, a system, method and storage medium containing computer implemented code are provided. The system for scheduling time intervals for a plurality of users comprises a database associated with one or more server means for storing a profile for each potential invitee of the system. Each invitee profile comprises user profiles that have information regarding available and unavailable times for that user and the electronic mail address for the user and resource profiles having information about the available times for a particular resource such as a room or equipment. A request generator connected over a network to the one or more server generates a request for allocation of a time interval for one or more of the plurality of invitees. The system then provides a busy time determination device that gathers the profiles for the plurality of invitees that were requested by the request generating means and that are available in the databases and determines whether those invitees are available during the time interval requested by the request generating means. For all available invitees, the electronic mail address in the profile is used to send each available requested invitee an invitation to attend at the requested time interval.

BRIEF DESCRIPTION OF THE DRAWINGS

FIG. 5 is a schematic illustration of a free time dialog box according to an embodiment of the invention.

FIG. 6 is a schematic illustration of a free time dialog box which shows invitees sorted in alphabetical order by who may not attend the proposed event during the date and time interval shown according to an embodiment of the invention.

FIG. 7 is a schematic illustration of a free time dialog box which shows invitees sorted in alphabetical order by who can attend the proposed event during the date and time interval shown according to an embodiment of the invention.

FIG. 8 is a schematic illustration of a free time dialog box which shows invitees sorted by alphabetical order, regardless of whether they can or cannot attend the proposed event according to an embodiment of the invention.

FIG. 9 is a schematic illustration of a free time dialog box which shows on a 7-day outlook the free times available for the proposed event during any given day according to an embodiment of the invention.

DETAILED DESCRIPTION OF THE INVENTION

The invention relates to an electronic calendar system with group scheduling that may be provided in, for example, a client/server architecture. The client/server connection may be a networked connection or a dial-up link. To understand the storage of this information, an example of the information requested by the user is provided.

Specifically, when a coordinator of an event desires to schedule the event using the system according to an embodiment of the present invention, the coordinator specifies the date, time, duration and selects one or more invitees. Invitees, as detailed below, may comprise users, resources (such as computer equipment, for example), or rooms, for example. This information may be input to the system through a graphical user interface, for example. The information that is provided is then taken by the system to determine whether that all of the selected invitees are available at the desired date, time, and duration.

According to an embodiment of the present invention, some or all of the users and their network addresses for a plurality of domains are stored in a name and address database or file, preferably on a server associated with that domain. Stored with each name and address file is a calendar file and a profile for a plurality of potential invitees.

Figure 1:
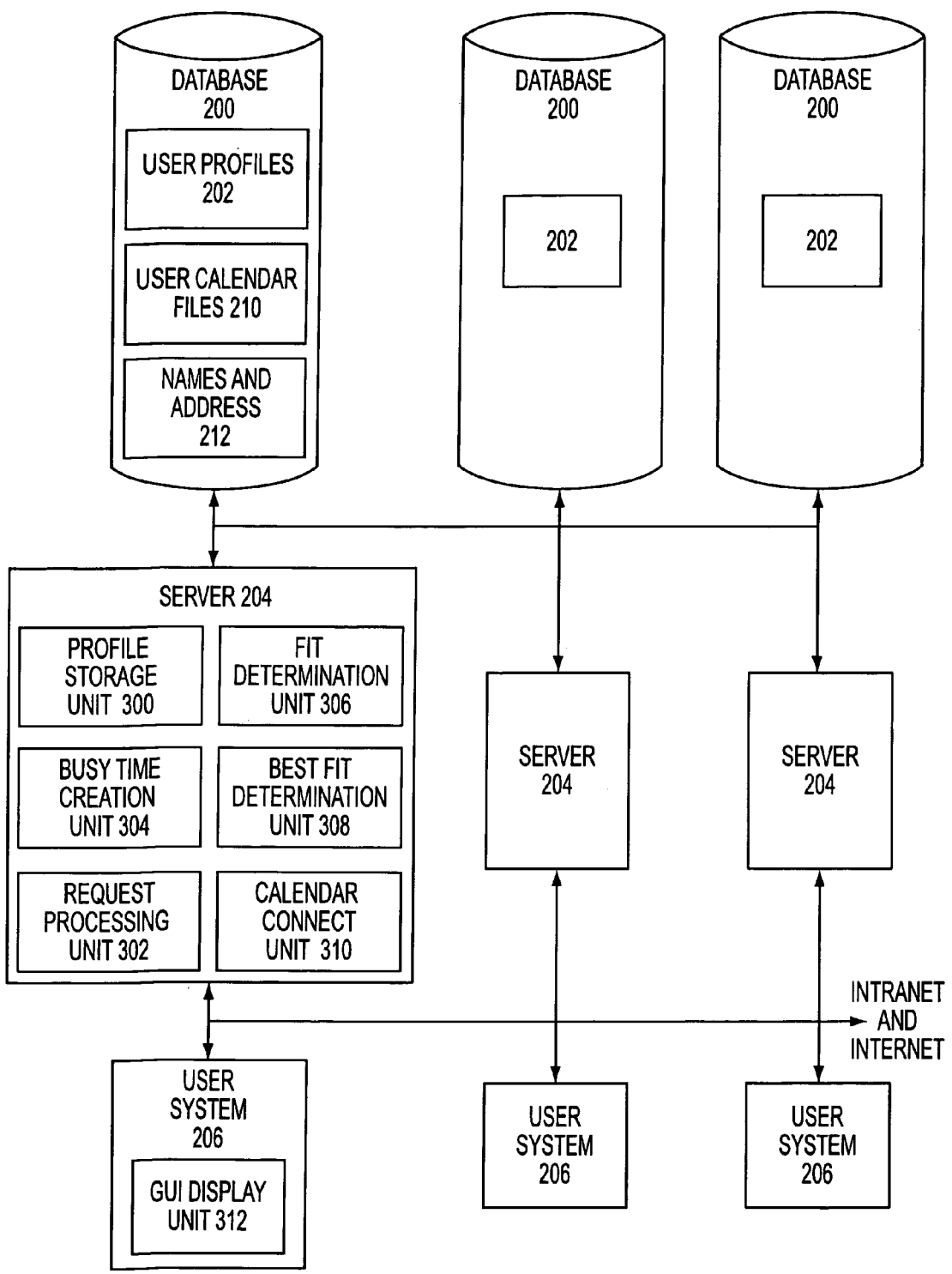
FIG. 1 is a schematic diagram of a system according to an embodiment of the present invention.

FIG. 1 depicts a system according to an embodiment of the present invention. According to this embodiment, the system of FIG. 1 may comprise one or more databases 200 having stored thereon one or more profiles 202, one or more calendar files 210 and one or more name and addresses files 212.

Name and addresses files 212 may comprise a list all of the names and electronic mail addresses for a plurality or all of the users on an electronic calendar system. A name and address file may be created for each invitee. For example, conference rooms, equipment, and other resources may be included as invitees.

Profiles 202 may comprise information regarding each invitee's work hours on a day to day basis (and hence his or her non-work hours), as well as the time zone in which he or she works, the physical location where he or she works, and the hours of that location. Other availability information about each invitee may be stored in the profile 202.

Calendar files 210 may comprise information regarding events that have already been scheduled for that invitee either by the user or by another coordinator.

According to one embodiment of the present invention, profiles 202 and calendar files 210 may be stored in an electronic mail file associated with each user. Collectively, the profiles 202 and calendar files 210 comprise availability information for a particular user. The electronic mail file may then be stored on one or more of servers 204 associated with the particular user.

Database 200 may then comprise an up-to-date collection of the availability information from those electronic mail files collected from some or all of the servers 204 on the system. Database 200 may be updated periodically to ensure that the information is up-to-date. This up-to-date database 200 may then be replicated to various sites on the system and associated with on one or more servers 204, as depicted in FIG. 1, for example.

Database 200 may be accessed by one or more servers 204 over a network. User systems 206 may be connected to the servers for providing requests of the servers. Each user system 206 may comprise a computer system connected over a network to one or more other users and to one or more servers. User systems 206 may also be connected over an intranet or over the internet to one or more other systems. According to an embodiment, user system 206 may be distributed at various locations or domains. Therefore, database 200 may be provided at each domain so that access to availability information may be direct from the local server for that user, rather than having to seek that information from a plurality of distributed servers across the network. In this embodiment, database 200 may comprise availability information for every user on the system. Central databases 200 may also be used.

Servers 204 may comprise one or more units for performing various functions of the system associated with performing this task. In one embodiment, server 204 may comprise a profile storage unit 300, a request processing unit 302, a busytime creation unit 304, a fit determination unit 306, a best fit determination unit 308 and a calendar connect unit 310. User system 206 may comprise a GUI display unit 312. The units that are depicted within server 204 may also or alternatively reside on user system 206. The GUI display unit 312 may also or alternatively reside on server 204.

Figure 2:
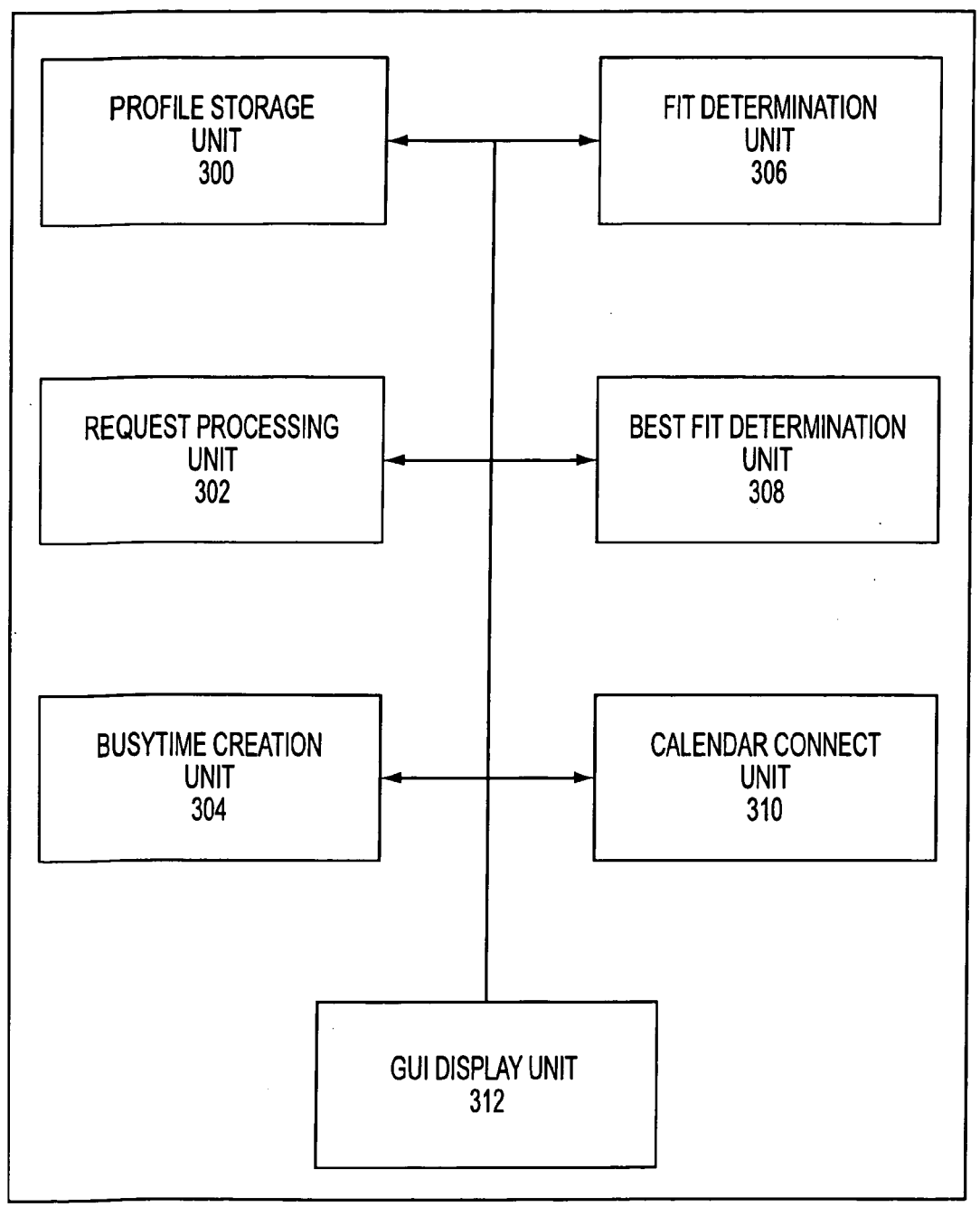
FIG. 2 is a schematic diagram of a system according to an embodiment of the present invention.

FIG. 2 depicts the components of a system according to an embodiment of the present invention. A description of these components is provided below. As discussed above, these components may reside either on the user systems, the servers, or in some instances, both. These components are the system components responsible for providing a plurality of functions, for example, those functions discussed below with respect to FIGS. 3 and 4. The system according to an embodiment of the present invention may comprise a profile storage unit 300 which determines the format and content of information stored in databases 200 for each user, resource, and room, for example. A request processing unit 302 performs the functions described of receiving a request for a event with all invitees and retrieving the availability information for those invitees from database 200.

A busy time creating unit 304 is responsive to the request processing unit 302 for generating a busy time file which lists the busy times for all invitees selected in the request and storing that information in database 200. Busy time creating unit 304 passes the busy time file to the fit determination unit 306 to determine whether the requested time complies with the busy time file generated. If not, the system calls on best fit determination unit 308 to determine the next best fit for the event. Additionally, a calendar connect unit 310 may be provided for accessing availability information for the invitees at the various databases 200 across system 50. The calendar connect unit 310 is responsible for obtaining busy-time information for users on other servers such as another Notes/Domino Server or on a other calendar system such as Profs or Schedule+.

A graphical user interface display unit 312 is provided. GUI display unit 312 may comprise a web browser, for example. GUI display unit 312 is responsible for presenting views to the user as described above with respect to FIGS. 5–9 and for receiving input from the coordinator regarding the requested event date, time, duration, and invitees. Other system components may also be present as described in more detail below.

According to one embodiment of the present invention, request processing unit 302 and busy time creation unit 304 may cooperate to perform asynchronous fanout. According to this system, request processing unit 302 requests profiles from one or more servers and passes those along to busy time creation unit 304 without waiting for all of the servers to respond. During the time that request processing unit 302 is waiting for replies, busy time creation unit 304 may be creating the busy time file based on the profiles retrieved. This pipelining process provides more real-time feedback while waiting on servers that may be busy or otherwise slow in response to the request. A request for busytime information for various users may result in consulting multiple servers, potentially across low-speed connections as well as other calendaring and scheduling systems. Freetime information (the times that are not busy for all invitees) may then be reported to the user as it is collected to provide incremental feedback as it is received by the system. Although the final result may not be received any quicker, the user gets some instantaneous feedback on how much information has been obtained.

Figure 3:
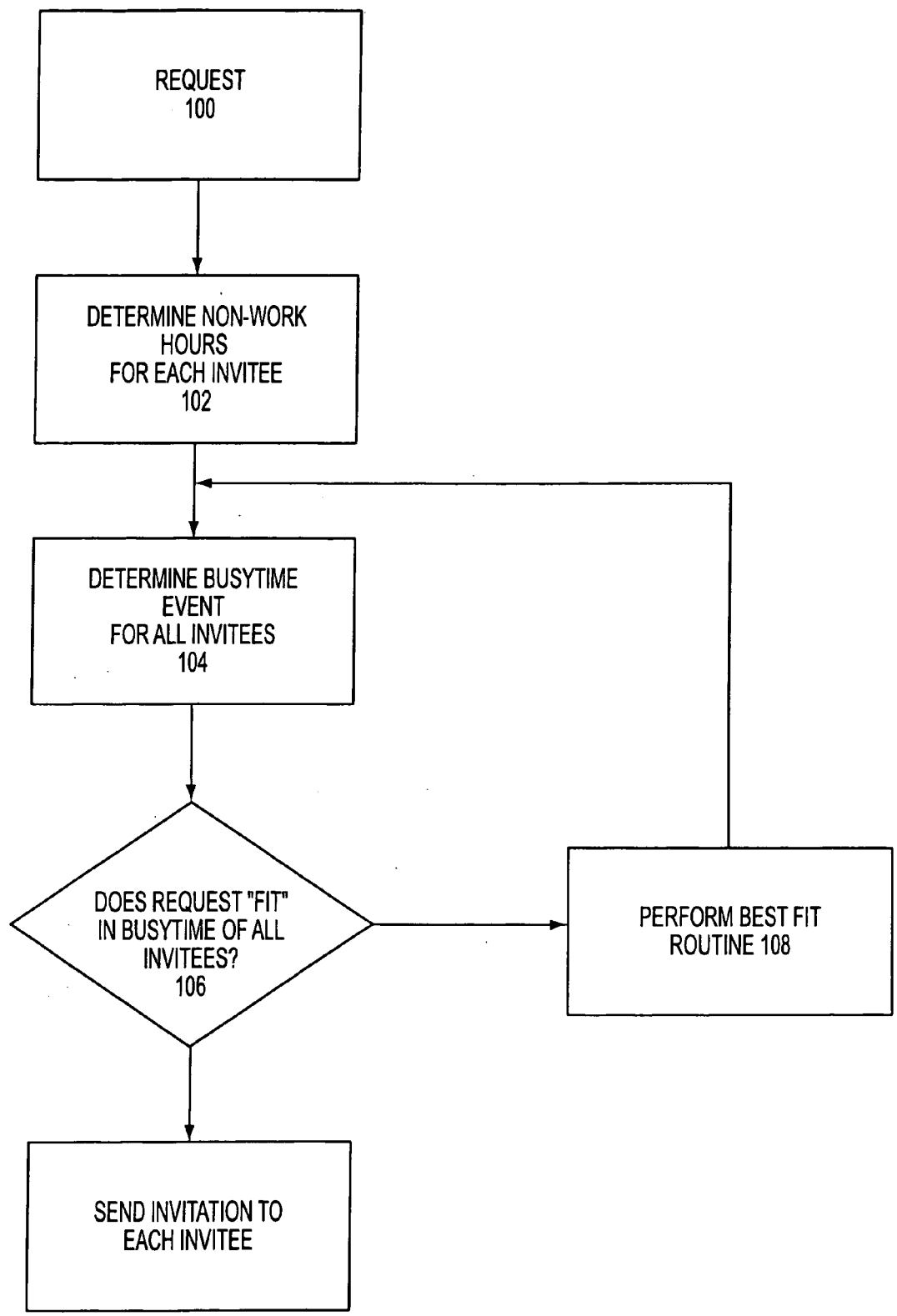
FIG. 3 is a flowchart for a method according to an embodiment of the present invention.
Figure 4:
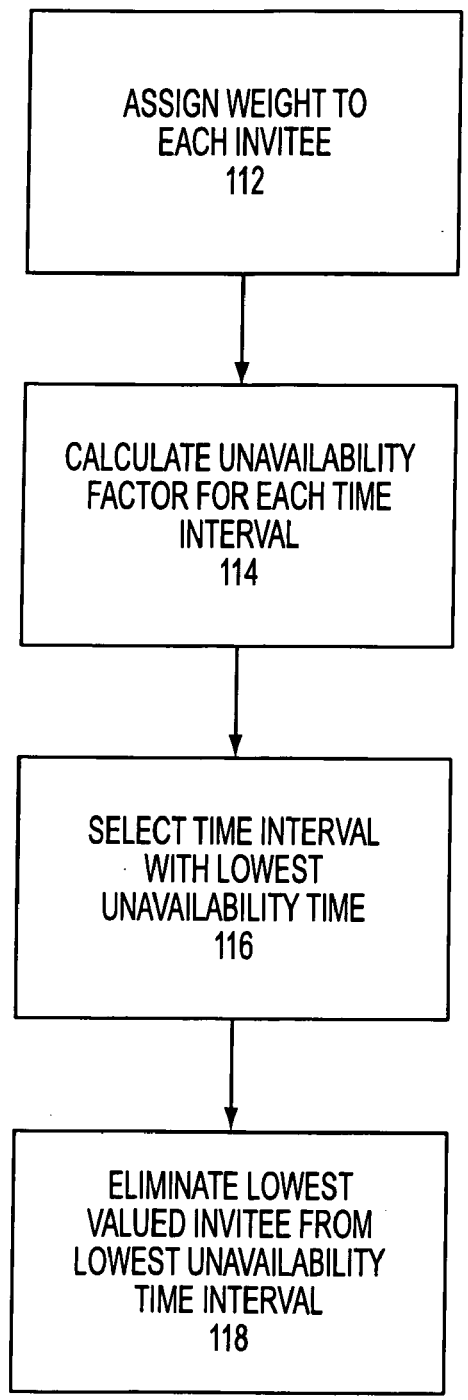
FIG. 4 is a flowchart for a method according to an embodiment of the present invention.

According to an embodiment of the present invention, a method according to the present invention is described below with respect to FIGS. 3 and 4. FIG. 3 depicts an embodiment of a method according to the present invention for scheduling a proposed event.

According to an embodiment of the present invention, the first step in scheduling an event is the generation of a request for an event, as in step 100. In the request, the coordinator may select desired invitees for the event, including any rooms or other resources that are needed for the event as well as a preferred date, time, duration, and location for the event. After all invitees have been selected, the system accesses availability information from database 200 and if necessary, through calendar connect unit 310 for invitees that may not be stored in database 200. As discussed above, invitee profiles and the calendar files that may be stored in and/or with each invitee's mail file, for example, (in step 102) for each invitee and stored in database 200. That availability information may then be used, in step 104, to determine the busy time events for the user for a certain time period requested.

The system then compares the list of busy times generated from the user's availability information to determine whether the user is available or not, in step 106. The process may also consider other potential event times and dates with the busy time file to determine if an alternative time may be proposed. If all invitees can attend, in step 110, the system sends an invitation to the invitees to attend the event, for example, by electronic mail using the address stored for each invitee. The invitees may then either accept the invitation, at which point the system would update their respective calendar files with the new event, or if the invitation is declined, the system notifies the requester.

According to an embodiment of the present invention, in step 106, invitee's profile information may be used when determining availability. Specifically, the invitee's time zone and work location may be considered if the event is to take place at a location remote from the invitee's work location. For example, if the event location provides resources which permit participation by remote means and in-person attendance is not required, then a person working in that location may be treated as available for a proposed event occurring at another location and/or time zone.

If an invitee is in a different time zone or place, and plans on physically attending the proposed event, then the user coordinator of the event is prompted to decide whether to make adjustments to ensure the availability of that invitee. The prompting may be done through the use of an additional dialog box that requests further clarification on how an invitee who is in a different time zone or location should have its free time treated for purposes of analyzing availability. The user proposing the event may have to make certain decisions such as whether the invitee's work schedule should be honored, and conferencing by remote means therefore used, or whether the invitee's work schedule should be disregarded, and physical attendance therefore requested or ordered.

A method according to an embodiment of the present invention also allows coordinators or users to change work hours, time zone, and place of work from a default setting to conform with information on a set travel itinerary. Using this method, invitees having travel plans on a given day may nonetheless have their availability taken into account for a proposed event occurring during that day. The method makes adjustments and accommodations for travel time en route to a proposed event.

A method according to an embodiment of the present invention also maintains profiles 202 on other invitees such as rooms and resources. Information such as room capacity and built-in resources are taken into account when determining availability and suitability for a proposed event.

If there is no such time interval during which all invitees are available, the system proceeds to determine a "best fit" in step 108. The process of step 108 is depicted in FIG. 4. In FIG. 4, the first step is that the coordinator is requested to assign a weight for each invitee in step 112. That step may be performed at the time the coordinator is asked to invite the resources or persons or may be delayed until a determination is made as to whether free time for all invitees may be located. Alternatively, default values may be assigned to types of resources. For example, the chairman and the conference room may be assigned a high weighting whereas other individuals may be assigned lower weighting.

In the next step, step 114, all time intervals within a range of the requested time are assigned a weighted unavailability value that is indicative of its relative unavailability for the proposed event. The weighted value is a function of the type of unavailability associated with a given invitee and the relative importance of the invitee's attendance at the proposed event. These factors are additive—therefore, the higher the weighted value, the less available the time interval will be.

The steps 112 and 114 may be illustrated with respect to the following example. In this example, the attendee characteristics listed below could be assigned arbitrary weights as follows:

| Unavailability of optional invitees | Weight 1 |
| Non-work hours for an invitee | Weight 1 |
| Conflicting events, appointments | Weight 2 |
| Unavailability of required invitees | Weight 10 |
| Unavailability of coordinator or room | Weight 100 |

Applying these relative weights, the assortment of unavailable situations produced in step 114 would be, for example, as listed below:

| Unavailability of coordinator or room due to conflicting appointment | Value 2000 |
| Unavailability of coordinator or room due to non-work hours | Value 1000 |
| Unavailability of required invitee due to conflicting appointment | Value 20 |
| Unavailability of required invitee due to non-work hours | Value 10 |
| Unavailability of optional invitee due to conflicting appointment | 2 |
| Unavailability of optional invitee due to non-work hours | 1 |

In the next step, steps 116 and 118, this method chooses an available time interval based on the lowest weighted value. A value of zero would mean that everyone invited could attend the proposed event at the suggested time interval. In this embodiment, in step 116, the system selects the time interval with the lowest weighted unavailability value. In step 118, the system then eliminates the invitee or resource with the lowest weighting assigned thereto. That new grouping is then returned to steps 104 and 106 to determine the busy times for the new set of invitees and to compare to determine whether those invitees are available at the requested time. to determine the busy times for those create a new busy time file with the new reduced list of invitees. The process repeats steps 104, 106, and 108 until a time interval is found based on the reduced number of invitees. That time is presented to the coordinator as a proposed alternative time with the "best fit."

When the user has been presented either with a time interval with no conflicting busy time or a best fit time interval and selects that time interval, the system then generates an invitation to the invitee. Other techniques for finding alternative times may also be used.

Figure 5:
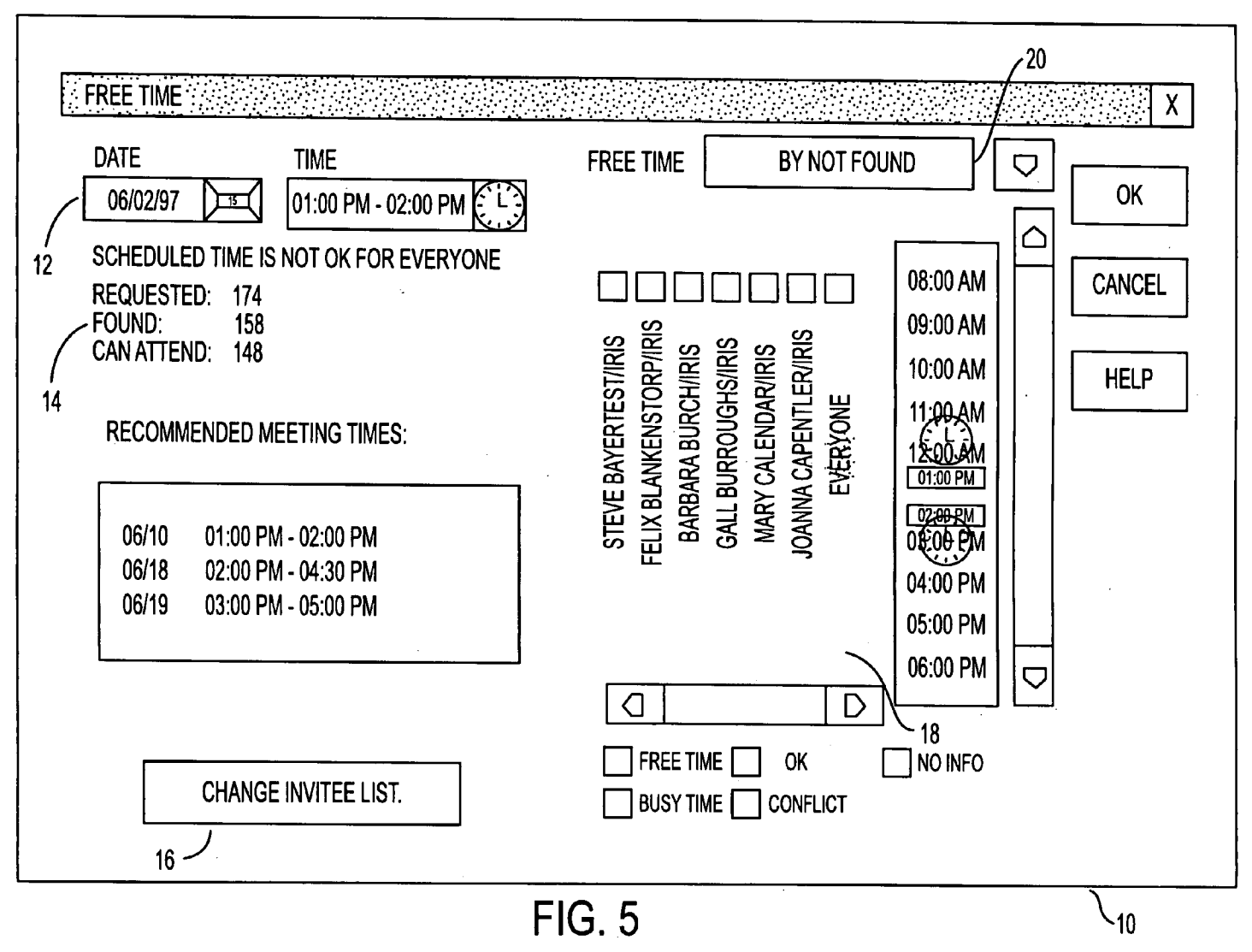

According to an embodiment of the present invention, the system may present information to a user on the system regarding availability of one or more potential invitees to a event or other event. The system may present this information in a variety of ways. In one view, the system may provide a free time dialog box 10 as depicted in FIG. 5, for example. FIG. 5 illustrates an example of the information that may be communicated when a user of the system requests a event. In one location of the view, event selection portion 12, for example, near the upper left hand corner of the box, the date and the time interval of the proposed event may be entered, which a coordinator may have entered to search for free time. A results portion 14 may then be presented in the free time dialog box 10. For example, results portion 14 may be displayed beneath the date and time of the proposed event. In this instance, the search results indicate that the scheduled time is not available for everyone who has been invited. Indeed, in the illustration of FIG. 5, of the 174 invitees for the proposed event, calendar information on only 158 was found, and of those invitees, only 148 were found to be available to attend. Based on the calendar information found for 158 invitees, the system according to the present invention provides alternative event times. In accordance with one aspect of the invention, these recommended event times represent the "best fit" for most of the invitees listed, as described in detail below. The search parameters (date, time, and duration of the proposed event), the search results, and the recommended event times are the same in FIGS. 5 through 9. A button 16 may be provided to permit the coordinator to modify the invitee list if desired. For example, button 16 may be located beneath the box showing the recommended event times. Various free time dialog views may be presented in a display selection portion 20. Display selection portion 20 may permit a user to display the views by:

By Day—Can Attend
By Day—Can Not Attend
By People—Not Found

FIGS. 5 through 9 present different views of the information retrieved by the system as a result of the search performed by the chairman. In FIG. 5, according to an embodiment of the present invention, the electronic calendar system presents a listing portion 18. Listing portion 18 may provide a list of the invitees sorted by those for whom calendar information cannot be found. The background shading for each of the displayed invitee names may be displayed to match a similar shading in the legend box labeled "No Info." A day planner showing the hours of the proposed event is shown in the box. Other shading/coloring or other graphical indications may be used in the boxes listing the individual names and/or graphical time bar to indicate "Free Time," "Busy Time," "OK," "Conflict," or "Other" status indicators. This feature combined with the ability to generate a variety of views may facilitate the coordination of a event. For example, a recommended event time portion 15 may be presented showing several optional times that have been determined using the best fit routine, for example.

Figure 6:
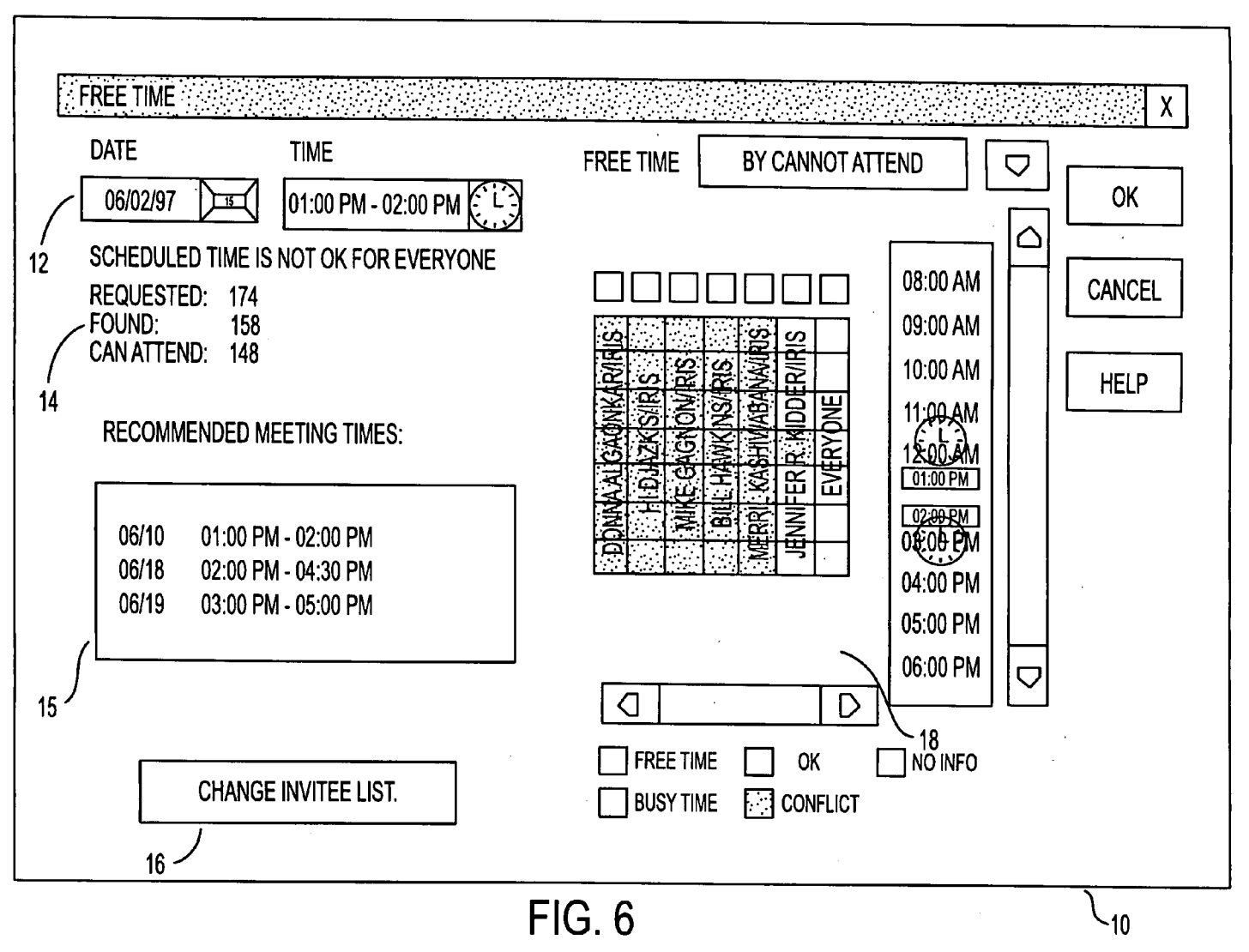

FIG. 6 presents an illustration of a view that lists invitees and their calendar information sorted by those who cannot attend. As this figure represents, it may be that all of the invitees have busy times during the time interval of the proposed event.

Figure 7:
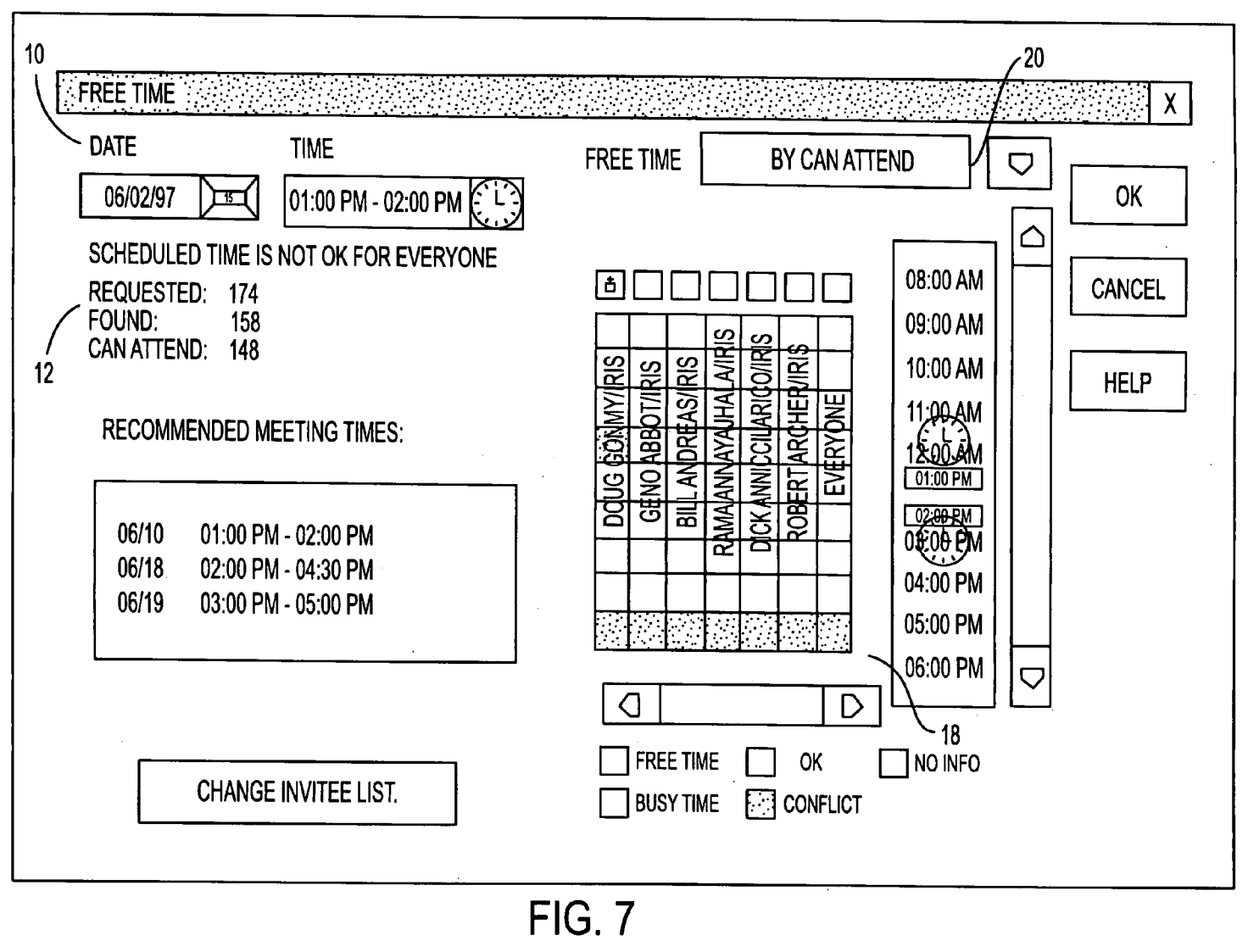

FIG. 7 presents an illustration of a view that lists invitees and their calendar information sorted by those who can attend in the listing portion 18. Listing portion 18 shows, the coordinator for the event first. In this example, "Doug Conmy/Iris," is the event coordinator, as may be identified by an icon above the name listing. The rest of the invitees who can attend may be presented in alphabetical order, for example. Other ordering sequences may also be used. All of these attendees show free time during the time interval of the proposed event. A graphical representation of the free and busy time is displayed for each individual. For example, "Doug Conmy/Iris" is shown graphically to be free from 9

AM to 5 PM except for 12–1 PM. Additionally, before 9 AM and after 5 PM are indicated as Busy Time, which could indicate his work hours.

Figure 8:
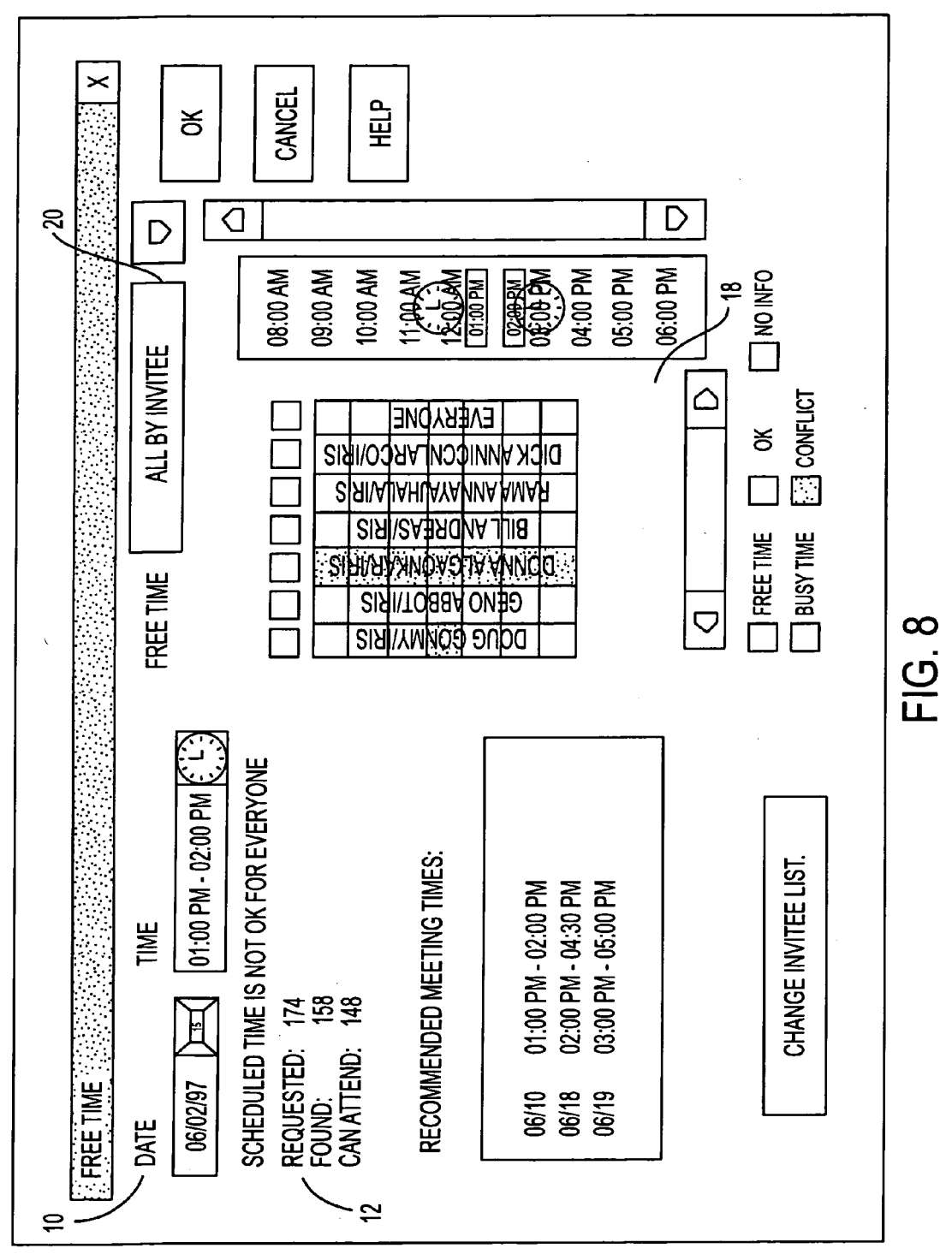

FIG. 8 presents an illustration of a view that lists all invitees and their calendar regardless of availability. Similar graphical information is displayed with other views.

Figure 9:
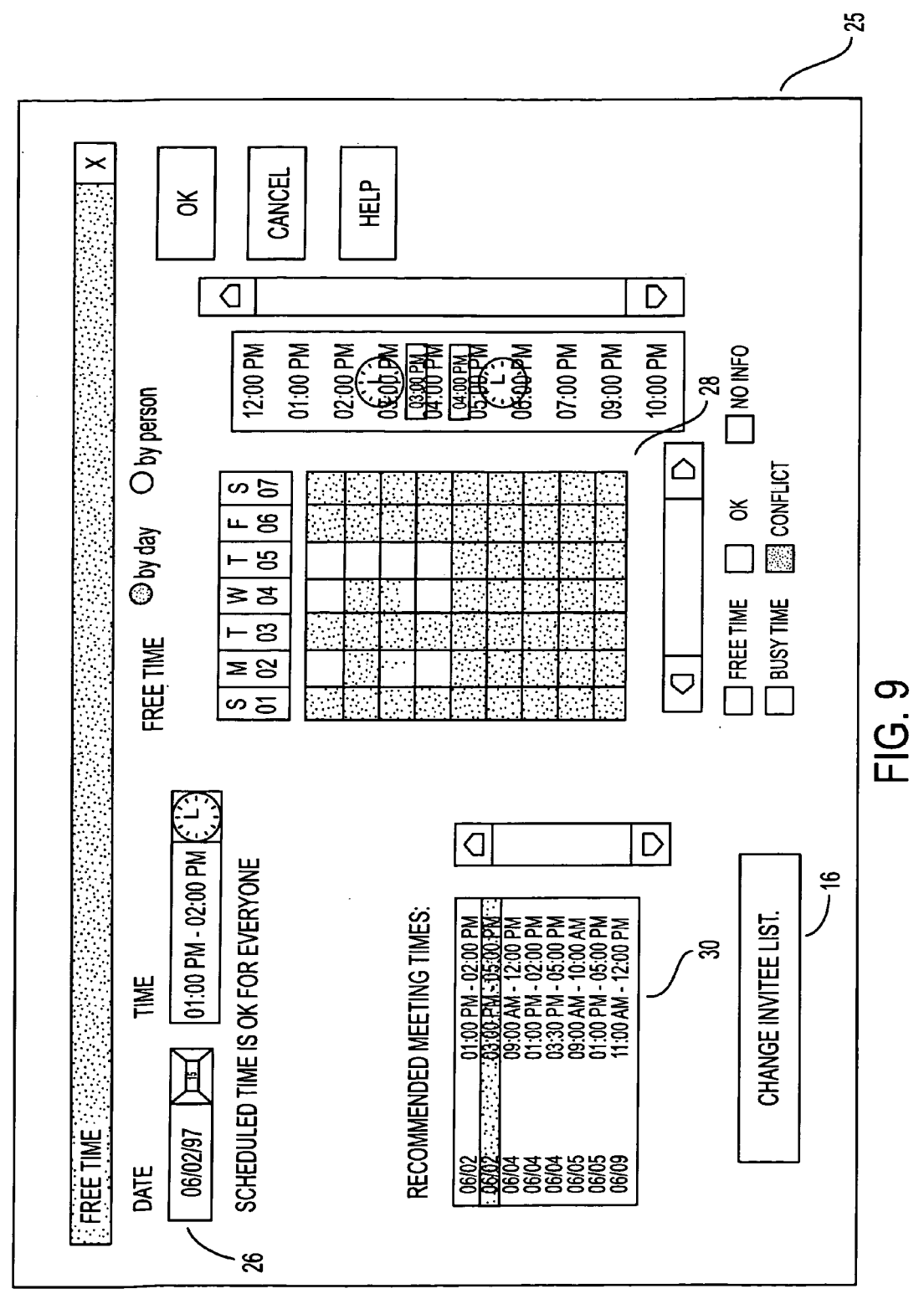

FIG. 9 illustrates another embodiment of a dialog box 25 according to another embodiment of the present invention. Dialog box 25 displays the search results for another proposed event. Again, dialog box 25 has an event selection portion 26 which may be displayed in the left hand side of the dialog box, for example. In this example, listing portion 28 indicates that the proposed date and time is available to all invitees. Moreover, the application has recommended a number of alternative event times in an alternative time portion 30. Listing portion 18 may display the calendar information as a daily composite for a 7-day (or other) period. According to the display, a block of free time from 1:00 p.m. to 5:00 p.m. is available for everyone on Thursday, June 5. The event coordinator may use this information in rescheduling the event. Otherwise, the event is already booked for its requested date and time slot. This view is a view of Free Time by day. The white blocks indicate free time, the gray blocks are busy time. This view is based on the composite busy time file generated by the system.

According to one embodiment of the present invention, the invention may be implemented by a software application designed to run on a client/server architecture such as Notes 4.5, in which a name/address book is kept for each person at each domain. In other words, the electronic mail address and calendar for each person are in the same database, so that calendar information may be exchanged via electronic mail. The system may also comprise a calendar connect unit 310 which may be used to go from server to server for the names and calendars of desired invitees. Calendar connect unit 310 enables the user who proposes an event to view attendee availability or unavailability for a given time interval and also to show attendees who cannot be found.

While various calendar schedule programs may be used with various e-mail programs, a preferred embodiment uses the Lotus Organizer calendar/schedule program with Lotus Notes or cc: Mail messaging program and a Lotus Domino server. The invention is not so limited. Various aspects and advantages of the preferred embodiment are detailed below.

The invention dramatically cuts the amount of time it takes to set up a event and book a room using Lotus Notes and Domino software. A user may send a event invitation to anyone from a Notes Name and Address book and virtually instantly view current busy and free time. A user may also attach a document (a event agenda, for example) to an invitation, and request optional or mandatory attendance.

The invention uses reliable, secure Notes routing to deliver invitations to other Notes and Organizer users. According to one embodiment, because the system is connected to intranet and internet, even people who do not use the system of the present invention, for example, Organizer or Notes, may be invited. Event invitees may then accept, decline, delegate a substitute, or re-schedule. Their responses may be automatically forwarded to the coordinator or coordinator. Once an invitee accepts a event invitation, their Organizer calendars are automatically updated as well as the coordinator's calendar. This enables coordinators to be able to check to see who can make it, who can't, and who's sending an alternate attendee.

One embodiment of the invention takes advantage of the powerful Notes and Domino environment to keep the chair/coordinator and every member of their team in touch even when out of the office. For example, a user may dial up and gain remote access to an Organizer file, the same way one may tap into a Notes mail file. Plus, the user may replicate the mail file and use it off-line to update a Calendar or schedule group events. A user may even view busy and free times for other users while on the road.

The invention enables a user to create links among entries stored in different sections of the Organizer. For example, link an appointment in Calendar to a customer in the Address book to an agenda in Notepad to a Web address. The user may then move quickly and directly between them to link ideas and information with people and projects.

The scheduling of group events and rooms via Lotus Notes and Domino has certain advantages. For example it enables a user to: select attendees from the Lotus Notes Name & Address book; view free and busy times by person or date in real time and pick from a list of available free times; send an e-mail invitation to non-Calendar users automatically; specify required or optional attendance; attach a file, such as a event agenda, to the event invitation; propose changes to event times and/or days by dragging and dropping; accept, decline, delegate or reschedule a event invitation; and see who has accepted, declined or delegated a event invitation at a glance.

The advantages of the present invention include that Information Technology ("IT") professionals want calendar and scheduling ("C&S") solutions that leverage the sizable investments already made in these infrastructures. They also want solutions that deliver real-time inter-enterprise scheduling, as well as mobile C&S access.

A C&S solution must meet the IT and personal C&S requirements dictated by end users. The solution must build an environment where personal calendars may be easily maintained by everyone who is expected to participate in electronic scheduling processes. It follows that for a C&S product to earn widespread user acceptance as a group scheduler, it must also offer rich PIM functionality and an intuitive and engaging user interface ("UI").

Collectively, these IT and end-user requirements call for a new generation of C&S product offerings. Existing generations of host-based C&S solutions cannot readily support mobile scheduling and they typically have outdated UIs. PIM solutions cannot support high-bandwidth, real-time scheduling nor can they offer management tools that integrate with the network and messaging infrastructure. The invention architecture delivers solutions that address the full spectrum of IT and end-user requirements.

Lotus Notes customers have a choice of at least two C&S application front ends—native Notes™ and Organizer™. Both C&S applications are fully integrated with Notes back-end services to provide seamless group scheduling. Each Notes user's mail database houses both mail and calendar information. Notes C&S and Organizer share common free-time services that offer real-time access to free/busy times and a common scheduling infrastructure. The Notes messaging infrastructure serves as the delivery vehicle for event notices and replies, while Notes replication ensures a robust, scaleable C&S solution that supports both LAN-connected and mobile users.

Both native Notes C&S and Organizer offer group scheduling to both connected and mobile users. The Organizer client additionally provides advanced PIM functionality. Running in a Notes environment, an Organizer user gains highly effective time management tools that include the popular Organizer tabs—Calendar, To Do, Address, Calls, Planner, Notepad, and Anniversary as well as advanced print output options for calendar and PIM information.

According to one embodiment, the Organizer front end is used with the cc:Mail DB8 back end to provide an equally powerful C&S product line for cc:Mail customers. Interoperability between Notes-based and cc:Mail-based C&S users is assured through the bi-directional cc:Mail Message Transfer Agent (MTA).

Organizations using the invention may migrate host-based calendar users to Notes or cc:Mail-based systems while maintaining co-existence as needed. The Lotus Office-Vision Calendar Connector (LOVCC) allows co-existence between host-based and LAN-based C&S. This high performance connector provides real-time, bi-directional query of free/busy times stored within Notes, Organizer, and OV calendars. It also enables exchange of event notices among Notes, Organizer, or cc:Mail clients and OV users, and IBM Time and Place/2™ (TaP/2) clients. The LOVCC may be used with OS/2®, Windows NT™, AIX®, and other server platforms.

One aspect of the invention is the integration of the C&S solution with a messaging and groupware infrastructure. Doing so provides several advantages, such as a scaleable and secure calendar store: the invention can scale with the same size, performance, and manageability characteristics of the underlying messaging and groupware infrastructure and can rely on its security capability. The storage of calendar information and mail information in a common data store provides this advantage.

Another advantage is that the present invention provides real-time access to scheduling and calendar information. Two important characteristics of a C&S solution are the ability to query free/busy times for small or large groups of people and the ability to perform these queries in real time. Another important characteristic is the ability to access calendar data itself. The invention not only support users who need to schedule events, conference rooms, and resources, or who wish to see their calendar information in real time, but they also transparently and automatically support these activities across multiple time zones.

A further advantage of the present invention is the provision of remote access and mobile scheduling. Mobile and disconnected users are provided nearly the same C&S functionality that is available to them when they are connected to the LAN. The invention lets users take their calendars on the road; receive and automatically synchronize calendar information on an as-needed basis; create and modify group events away from the office; and provide the option to access scheduling information in real time. Also, Web server and browser technology that allows users to access calendar information across the Internet is incorporated in the present invention.

Yet another advantage is that the present invention provides inter-enterprise scheduling. Customers may schedule events with suppliers, business partners, and other individuals who work outside the bounds of a user's organization. The ability to exchange event notices and check free-time across public networks such as the Internet meets this requirement. The invention's architecture leverages Internet protocols to deliver this type of inter-enterprise scheduling.

Another advantage of the present invention is that it provides cross platform support. Users within an organization need to be able to schedule events with each other, no matter what operating systems the event coordinator or attendees are using. The invention has full feature/function parity for all major GUI client platforms, including Windows®3.1, Windows 95, Windows NT, OS/2, Macintosh®, and UNIX®. All major server platforms are similarly supported.

The marriage of C&S and mail promotes higher levels of end-user productivity. The mobile advantages afforded to Notes mail users are naturally extended to C&S users. The Notes Release 4 mail user interface is a three pane interface that allows a user to organize their mail, see their messages, and read individual messages without jumping from window to window. In Notes 4.5, additionally, the calendar and scheduling functionality is seemlessly integrated without mail functionality. The Notes R4 Mail UI is home for all event invitations, delegations, proposed reschedules, and accept/decline notices, all of which are funneled through the Notes mail inbox. Scheduling a event off-line, for example, is no more complicated than creating a mail message off-line, and users are not required to switch from one application to another to schedule an appointment. Another facet of Notes C&S is integrated task management. Users often receive tasks through e-mail. Joining C&S and mail means that users may click on an assignment to turn it into a task that can be prioritized, tracked, or even delegated. Users also have the ability to authorize others (an administrative assistant, for example) to access and/or manipulate their mail and calendar information.

There is also integration with desktop applications. For example, if an upcoming event requires review of a proposed budget, a linked spreadsheet is available for review with the click of a mouse directly from any Organizer entry. Organizer takes this functionality one step further with OLE support in the Notepad. Users can embed and link information from other OLE applications, such as Lotus Smart-Suite® and Microsoft® Office applications, directly in the Notepad section, and may even create OLE objects to access their favorite Internet Web sites.

At the group scheduling level, Organizer permits users to view free/busy times of other LAN users in real time. It also permits them select a convenient event time and location and send event invitations, complete with attachments, to anyone in the Notes Name & Address Book or cc:Mail directory. At the same time, users can reserve a conference room and audio-visual equipment or circulate a event agenda.

Organizer leverages Notes and cc:Mail messaging services to route event requests. Invitees may accept the event invitation, decline the invitation, propose another event time, or delegate a substitute to attend. Accepted events are automatically posted to the user's calendar. This event status information is made available in graphical form to the event coordinator with just the click of a mouse. In addition, all the C&S mobile capability in Notes and cc:Mail is also available to Organizer users.

In addition to deploying their choice of C&S front ends, customers may choose the format for storing user and resource profiles—either Notes.NSF or cc:Mail DB8—that best meets their business requirements. Native Notes C&S and Organizer clients running within a Notes environment store calendar information in the Notes mail database (MAIL.NSF). One data store may support both C&S and mail information for both clients.

By using a Notes based mail data store for mail and C&S, the scalability and security of native Notes C&S and Organizer utilize the scalability and security model of Notes itself. A common data store enables one database schema, one security model, one set of replication processes, one directory, one transport platform, and one set of administration tools to serve both mail and C&S information.

A user according to the present invention, such as a client on a Notes system, may store its calendar information in the DB8 message store. Again, one database schema, one security model, one directory, one transport platform, and one set of administration tools serve both mail and C&S information, enterprise-wide.

Within the framework of the C&S architecture, a user's calendar information is stored alongside his or her mail information in a common data store. That means that calendar information is updated simultaneously and seamlessly with e-mail, extending the full range of Notes and cc:Mail mobile support capabilities to C&S. As with e-mail, the remote C&S user automatically receives up-to-date calendar information. Mobile C&S users, whether they are native Notes, cc:Mail, or Organizer users, may create and respond to event notices, set up events, and track event status off-line just as easily as they may create and respond to mail messages off-line.

The C&S architecture integrates elements of real-time calendaring with the powerful, messaging-based infrastructure of Notes and cc:Mail to provide a robust scheduling application that works well for both connected and disconnected users.

A free-time query process provides real-time, graphical views of others' free/busy times. Real-time queries of free/busy time information are accomplished with free-time viewers for Notes, cc:Mail, Organizer, OV, and TaP/2 calendars. Free-time queries are available across multiple servers, and across multiple time zones. A user, if authorized, may also see another user's calendar.

The free-time query process may also offer intelligent resource scheduling, allowing users not only to reserve a event room, but also to match requirements for room capacity, audio-visual equipment, catering, and even seating configurations.

Users of the system according to the present invention may choose the front-end clients, back-end data stores, and scheduling services best suited to their environments. Native Notes and Organizer C&S choices are fully interoperable. Users may also deploy a mix of native Notes and Organizer C&S client applications. Native Notes C&S may use the Notes .NSF data store. Organizer clients may use either the Notes .NSF data store or the cc:Mail DB8 data store. Between Notes and cc:Mail environments, interoperability is ensured through the cc:Mail MTA. The cc:Mail MTA runs on the Notes R4 server. It provides high performance, bi-directional translation of event notices between Notes R4 and cc:Mail R7 users.

The Notes R4 SMTP MTA provides a facility for Notes R4 forms to tunnel through the Internet. In this way, if Notes R4 is running at a supplier's site and Notes R4 is running at a manufacturer's site, the SMTP/MIME mail gateway enables transport of event notices (invitations, accepts/declines, etc.) across the Internet.

Workers do not use their calendars simply to schedule personal appointments and group events; they allot blocks of time to complete small tasks as well as complex projects that require days, weeks, or even months. A user's calendar is a metaphor for his or her time. Therefore, the C&S software incorporates task and project management as well as event management facilities. Like events, parallel tasks and completion dates can cause conflicts.

The invention may use a method which assigns and computes priorities of tasks and events to help users formulate more efficient short-term and long-term time management strategies.

Other embodiments and uses of this invention will be apparent to those having ordinary skill in the art upon consideration of the specification and practice of the invention disclosed herein. The specification and examples provided herein should be considered exemplary only. The scope of the invention is only defined by the claims appended hereto.

What is claimed is:

1. A system for scheduling time intervals for a plurality of invitees comprising:
    database means in communication with one or more server means for storing one or more invitee profiles for one or more potential invitees of the system, the one or more invitee profiles comprising user profiles wherein each user profile comprises information regarding available and unavailable times for that user and an electronic mail address for the user;
    request generating means, connected over a network to the one or more server means, for generating a request for allocation of a time interval for the one or more potential invitees;
    busy time determination means for gathering the one or more invitee profiles for the one or more potential invitees that were requested by the request generating means and that are available in the database means and automatically determining whether those one or more potential invitees are available during the time interval requested by the request generating means;
    means for scheduling a meeting by using the electronic mail address in the invitee profile to automatically send each of the one or more potential invitees available an electronic mail invitation to attend at the time interval requested based on the automatic determination made by the busy time determination means as to whether those one or more potential invitees are available during the time interval requested, wherein each of the one or more potential invitees that receives an electronic mail invitation becomes an invitee;
    means for enabling the invitee to respond to the electronic mail invitation; and
    means for automatically updating the invitee's invitee profile based on the invitee's response to the electronic mail invitation.

2. The system of claim 1 wherein the invitee profiles comprise resource profiles regarding one or more resources wherein each resource profile comprises information regarding available and unavailable times for the resource.

3. The system of claim 2 wherein the one or more resources include a plurality of rooms and wherein the profile comprises information about the capacity of each room.

4. The system of claim 3 wherein the one or more resources include equipment.

5. The system of claim 1, wherein the plurality of response options further includes assigning a substitute attendee for the meeting and requesting for re-scheduling the meeting.

6. A system for scheduling time intervals for a plurality of invitees comprising:
    one or more databases, in communication with one or more servers, which store one or more invitee profiles for one or more potential invitees of the system, the one or more invitee profiles comprising user profiles wherein each user profile comprises information regarding available and unavailable times for that user and the electronic mail address for the user;
    one or more user workstations, connected over a network to the one or more servers, operating a calendaring system that permits a user to request allocation of a time interval for the one or more potential invitees;
    wherein the calendaring system gathers the profiles for the one or more potential invitees that are available in the one or more databases and automatically determines whether those one or more potential invitees are available during the time interval requested;

wherein the calendaring system automatically invites the one or more potential invitees, based on the automatic determination made by the calendaring system as to whether the one or more potential invitees are available during the time interval requested, by using the electronic mail address stored in the invitee profile for the one or more potential invitees to automatically send an electronic mail invitation to the one or more potential invitees if the one or more potential invitees are available, wherein each of the one or more potential invitees that receives an electronic mail invitation becomes an invitee;

wherein the calendaring system enables the invitee to respond to the electronic mail invitation; and wherein the calendaring system automatically updates the invitee's invitee profile based on the invitee's response to the electronic mail invitation.

7. The system of claim 6, wherein the invitee profiles comprise resource profiles regarding one or more resources, wherein each resource profile comprises information regarding available and unavailable times for the one or more resources.

8. The system of claim 7, wherein the one or more resources include rooms and wherein the profile comprises information about the capacity of the rooms.

9. The system of claim 8 wherein the one or more resources include equipment.

10. The system of claim 6, wherein the plurality of response options further includes assigning a substitute attendee for the meeting and requesting for re-scheduling the meeting.

11. A process for scheduling time intervals for a plurality of invitees comprising:

storing one or more invitee profiles for one or more potential invitees of the system in a database in communication with one or more servers, the one or more invitee profiles comprising user profiles wherein each user profile comprises information regarding available and unavailable times for that user and an electronic mail address for the user;

receiving a request for allocation of a time interval for the one or more potential invitees from a remote workstation over a network at the one or more servers;

gathering the profiles for the one or more potential invitees that are available in the database;

determining automatically whether those one or more potential invitees are available during the time interval requested;

inviting the one or more potential invitees to attend at the time interval requested automatically, based on the automatic determination made as to whether the one or more potential invitees are available during the time interval requested, by using the electronic mail address stored in the profile for those one or more potential invitees to automatically send an electronic mail invitation to the one or more potential invitees if the one or more potential invitees are available, wherein each of the one or more potential invitees that receives an electronic mail invitation becomes an invitee;

enabling the invitee to respond to the electronic mail invitation; and automatically updating the invitee's invitee profile based on the invitee's response to the electronic mail invitation.

12. The process of claim 11, wherein the invitee profiles comprise resource profiles regarding one or more resources, wherein each resource profile comprises information regarding available and unavailable times for the one or more resources.

13. The process of claim 12, wherein the one or more resources include rooms and wherein the profile comprises information about the capacity of the rooms.

14. The process of claim 12, wherein the one more resources include equipment.

15. The process of claim 11, wherein the plurality of response options further includes assigning a substitute attendee for the meeting and requesting for re-scheduling the meeting.

16. A processor usable medium having processor readable code embodied therein for enabling group calendaring between a plurality of users on a computer system, the system comprising a database, associated with one or more servers, which stores one or more invitee profiles for one or more potential invitees of the system, the invitee profiles comprising user profiles wherein each user profile comprises information regarding available and unavailable times for that user and an electronic mail address for the user, the processor readable code in the processor usable medium comprising:

processor readable code for causing a processor to receive a request for allocation of a time interval for one or more potential invitees;

processor readable code for causing a processor to gather the profiles for the one or more potential invitees;

processor readable code for causing a processor to automatically determine whether those one or more potential invitees are available during the requested time interval;

processor readable code for causing a processor to automatically invite the one or more potential invitees to attend a meeting at the requested time interval, based on the automatic determination made as to whether the one or more potential invitees are available during the time interval requested, by using the electronic mail address stored in the profile for each invitee to send an electronic mail invitation to the one or more potential invitees if the one or more potential invitees are available, wherein each of the one or more potential invitees that receives an electronic mail invitation becomes an invitee;

processor readable code for causing a processor to enable the invitee to respond to the electronic mail invitation; and processor readable code for causing a processor to automatically update the invitee's profile based on the invitee's response to the electronic mail invitation.

17. The medium of claim 16, wherein the invitee profiles comprise resource profiles regarding one or more resources, wherein each resource profile comprises information regarding available and unavailable times for the one or more resources.

18. The medium of claim 17, wherein the one or more resources include rooms and wherein the profile comprises information about the capacity of the rooms.

19. The medium of claim 18, wherein the one or more resources include equipment.

20. The medium of claim 16, wherein the plurality of response options further includes assigning a substitute attendee for the meeting and requesting for re-scheduling the meeting.

21. A system for scheduling an event, comprising:

a database that stores availability information for one or more potential invitees to the event;

a server operable to access the database and retrieve the availability information; and a user system operable to send to the server a scheduling request specifying a list of invitees, a date, a start time, and an end time and/or a duration which determines the end time, wherein the server is further operable to:

receive the scheduling request;

retrieve from the database availability information for one or more of the invitees listed in the request;

determine automatically whether or not the one or more invitees are available to attend the event based on the availability information;

send an electronic mail invitation to one or more of the invitees listed in the request automatically based on the automatic determination made as to whether the one or more invitees are available to attend the event;

receive from an invitee a response to the electronic mail invitation; and modify the availability information for the invitee automatically if the invitee's response indicates that the invitee accepts the electronic mail invitation, wherein the availability information is modified to indicate that the invitee is busy between at least the start time and end time on the date specified in the request.

22. The system of claim 21, wherein the server determines whether or not the one or more invitees are available to attend the event by examining the availability information and determining whether or not the one or more invitees are busy between the start time and end time on the date specified in the scheduling request.

23. The system of claim 21, wherein the server is further operable to determine one or more alternative start times for the event, wherein the determination is based, at least in part, on the retrieved availability information.

24. The system of claim 23, wherein the determination of the one or more alternative start times is further based on weighting values assigned to one or more of the invitees.

25. The system of claim 21, wherein the scheduling request further specifies an event location and the availability information for one of the invitees includes the location of the invitee.

26. The system of claim 25, wherein the server is further operable to take into account a travel time from the location of the invitee to the event location in determining whether or not the invitee is available to attend the event.

27. The system of claim 21, wherein availability information for an invitee comprises profile information and calendar information.

28. The system of claim 27, wherein the profile information for an invitee comprises information regarding the invitee's work hours, the time zone in which the invitee works, and the location where the invitee works.

29. The system of claim 27, wherein the calendar information comprises information regarding events that have been scheduled for the invitee.

30. The system of claim 21, wherein the plurality of response options further includes assigning a substitute attendee for the meeting and requesting for re-scheduling the meeting.

31. A method for scheduling an event, comprising:

storing availability information for one or more potential invitees to the event;

receiving from an event coordinator a scheduling request specifying a list of invitees, a date, a start time, and an end time and/or a duration which determines the end time;

retrieving availability information for one or more of the invitees listed in the request in response to receiving the request;

determining automatically whether or not the one or more invitees are available to attend the event;

sending an electronic mail invitation to one or more of the invitees listed in the request automatically based on the automatic determination made as to whether the one or more invitees are available to attend the event;

receiving from an invitee a response to the electronic mail invitation; and modifying the availability information for the invitee automatically in response to receiving the invitee's response if the invitee's response indicates that the invitee accepts the electronic mail invitation, wherein the availability information is modified to indicate that the invitee is busy between at least the start time and end time on the date specified in the request.

32. The method of claim 31, wherein availability information for an invitee comprises profile information and calendar information.

33. The method of claim 32, wherein the profile information for an invitee comprises information regarding the invitee's work hours, the time zone in which the invitee works, and the location where the invitee works.

34. The method of claim 32, wherein the calendar information comprises information regarding events that have been scheduled for the invitee.

35. The method of claim 31, wherein the plurality of response options further includes assigning a substitute attendee for the meeting and requesting for re-scheduling the meeting.

36. A computer readable medium, having encoded thereon a computer program operative to perform the method comprising storing availability information for one or more potential invitees to the event;

receiving from an event coordinator a scheduling request specifying a list of invitees, a date, a start time, and an end time and/or a duration which determines the end time;

retrieving availability information for one or more of the invitees listed in the request in response to receiving the request;

determining automatically whether or not the one or more invitees are available to attend the event;

sending an electronic mail invitation to one or more of the invitees listed in the request automatically based on the automatic determination made as to whether the one or more invitees are available to attend the event;

receiving from an invitee a response to the electronic mail invitation; and modifying the availability information for the invitee automatically in response to receiving the invitee's response if the invitee's response indicates that the invitee accepts the electronic mail invitation, wherein the availability information is modified to indicate that the invitee is busy between at least the start time and end time on the date specified in the request.

37. The medium of claim 36, wherein the plurality of response options further includes assigning a substitute attendee for the meeting and requesting for re-scheduling the meeting.

* * * * *